US009719390B2

(12) United States Patent
Hariu et al.

(10) Patent No.: US 9,719,390 B2
(45) Date of Patent: Aug. 1, 2017

(54) CHEMICAL HEAT STORAGE DEVICE

(71) Applicant: KABUSHIKI KAISHA TOYOTA JIDOSHOKKI, Kariya-shi, Aichi (JP)

(72) Inventors: Satoshi Hariu, Kariya (JP); Takafumi Yamasaki, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 14/890,645

(22) PCT Filed: May 15, 2014

(86) PCT No.: PCT/JP2014/062965
§ 371 (c)(1),
(2) Date: Nov. 12, 2015

(87) PCT Pub. No.: WO2014/192555
PCT Pub. Date: Dec. 4, 2014

(65) Prior Publication Data
US 2016/0123202 A1    May 5, 2016

(30) Foreign Application Priority Data

May 28, 2013  (JP) ................................ 2013-111789

(51) Int. Cl.
*F01N 3/10* (2006.01)
*F01N 3/20* (2006.01)
(Continued)

(52) U.S. Cl.
CPC ......... *F01N 3/2006* (2013.01); *F01N 13/009* (2014.06); *F01N 13/14* (2013.01);
(Continued)

(58) Field of Classification Search
CPC ....... F01N 3/20006; F01N 13/009; F24J 1/00; F28D 20/003
(Continued)

(56) References Cited

U.S. PATENT DOCUMENTS

2012/0017569 A1   1/2012   Gaiser
2014/0224453 A1*  8/2014   Yamauchi ............. F28D 20/003
                                                165/104.12

FOREIGN PATENT DOCUMENTS

JP         57-23879 B2      5/1982
JP        59-208118 A      11/1984
(Continued)

OTHER PUBLICATIONS

Communication dated Nov. 24, 2016, from the European Patent Office in counterpart European application No. 14804949.7.
International Preliminary Report on Patentability dated Dec. 10, 2015, issued by the International Bureau in corresponding International Application No. PCT/JP2014/062965.
(Continued)

*Primary Examiner* — Jason Shanske
(74) *Attorney, Agent, or Firm* — Sughrue Mion, PLLC

(57) ABSTRACT

A chemical heat storage device heats a subject to be heated existing in a pipe. The chemical heat storage device includes a reactor that generates heat by chemically reacting with a reaction medium, an absorber that causes an absorbent to absorb and stores the reaction medium, and a connection tube that is connected to the reactor and absorber, for the reaction medium to migrate through. The reactor includes a solid reaction material disposed along an outer peripheral surface of a place where the subject exists in the pipe and a casing that seals the reaction material so as to form a space along an outer peripheral surface of the reaction material. One end of the connection tube is open to the space.

4 Claims, 7 Drawing Sheets

(51) Int. Cl.
*F28D 20/00* (2006.01)
*F28D 21/00* (2006.01)
*F24J 1/00* (2006.01)
*F01N 13/14* (2010.01)
*F01N 13/00* (2010.01)
*F01N 3/26* (2006.01)
*F01N 3/021* (2006.01)

(52) U.S. Cl.
CPC .............. *F24J 1/00* (2013.01); *F28D 20/003* (2013.01); *F28D 21/0003* (2013.01); *F01N 3/021* (2013.01); *F01N 3/103* (2013.01); *F01N 3/106* (2013.01); *F01N 3/2066* (2013.01); *F01N 3/26* (2013.01); *F01N 2240/10* (2013.01); *F01N 2240/18* (2013.01); *F01N 2470/24* (2013.01); *Y02E 60/142* (2013.01); *Y02T 10/26* (2013.01)

(58) Field of Classification Search
USPC .......................................................... 60/299
See application file for complete search history.

(56) References Cited

FOREIGN PATENT DOCUMENTS

| | | |
|---|---|---|
| JP | 60-103297 A | 6/1985 |
| JP | 4-98094 A | 3/1992 |
| JP | 4-136689 A | 5/1992 |
| JP | 5-125929 A | 5/1993 |
| JP | 07-247832 A | 9/1995 |
| JP | 2522378 Y2 | 1/1997 |
| JP | 11-125113 A | 5/1999 |
| JP | 2005-076453 A | 3/2005 |
| JP | 3869206 B2 | 1/2007 |
| JP | 2010-151435 A | 7/2010 |
| JP | 2011-208865 A | 10/2011 |
| JP | 2013-072558 A | 4/2013 |

OTHER PUBLICATIONS

International Search Report dated Aug. 12, 2014, issued by the International Bureau in corresponding International Application No. PCT/JP2014/062965.

* cited by examiner

Fig. 3
(a)
(b)
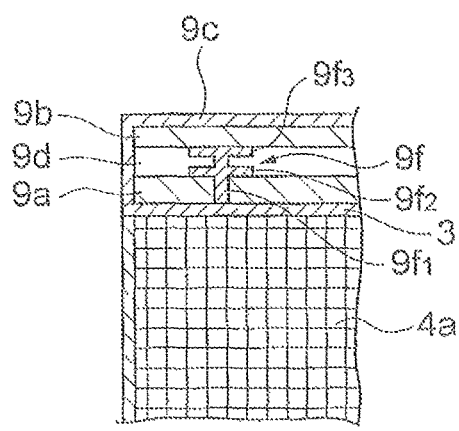
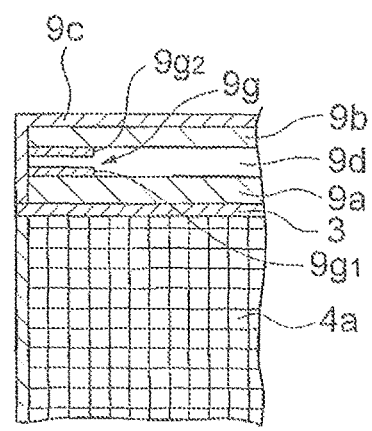

Fig. 4
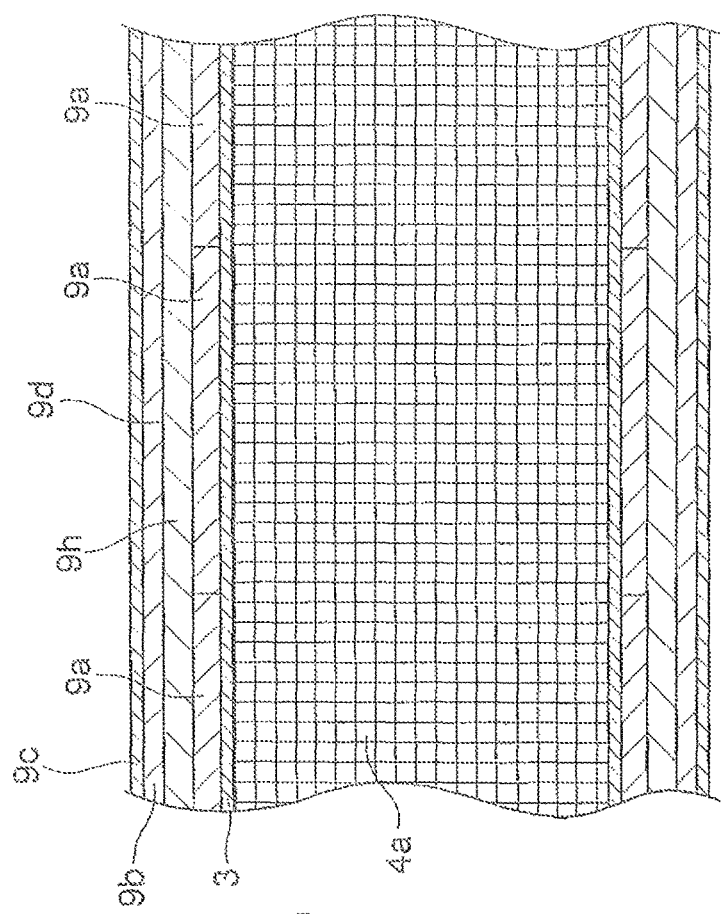
(a)
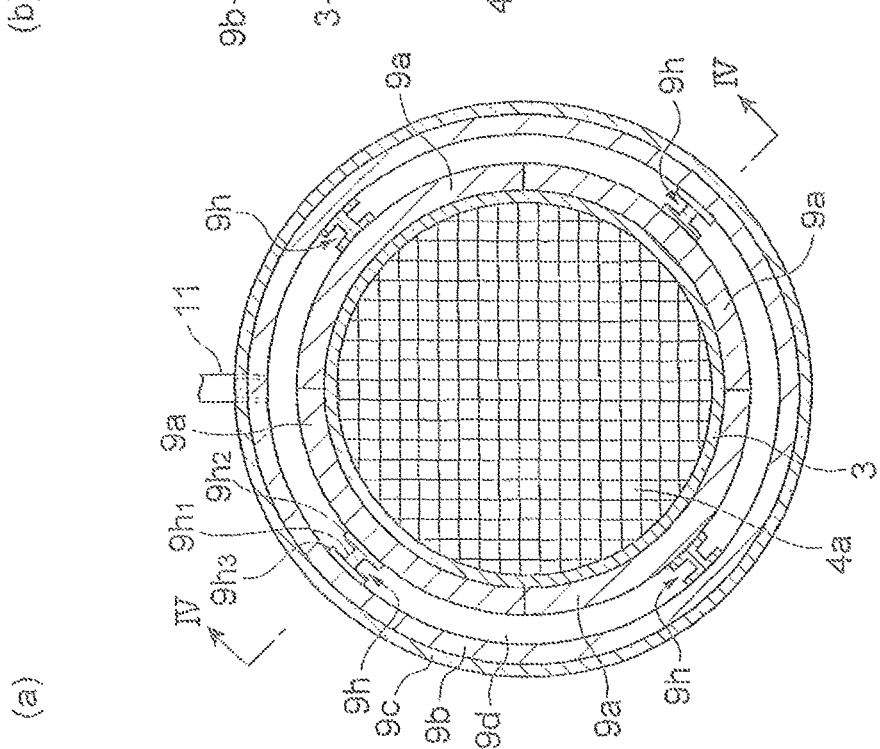
(b)

Fig. 6
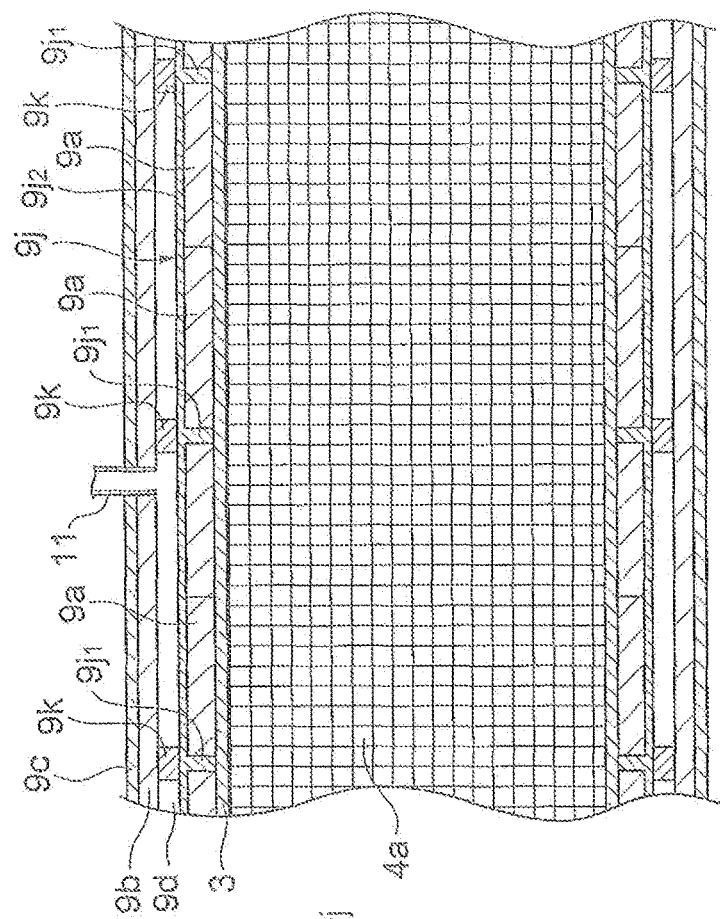
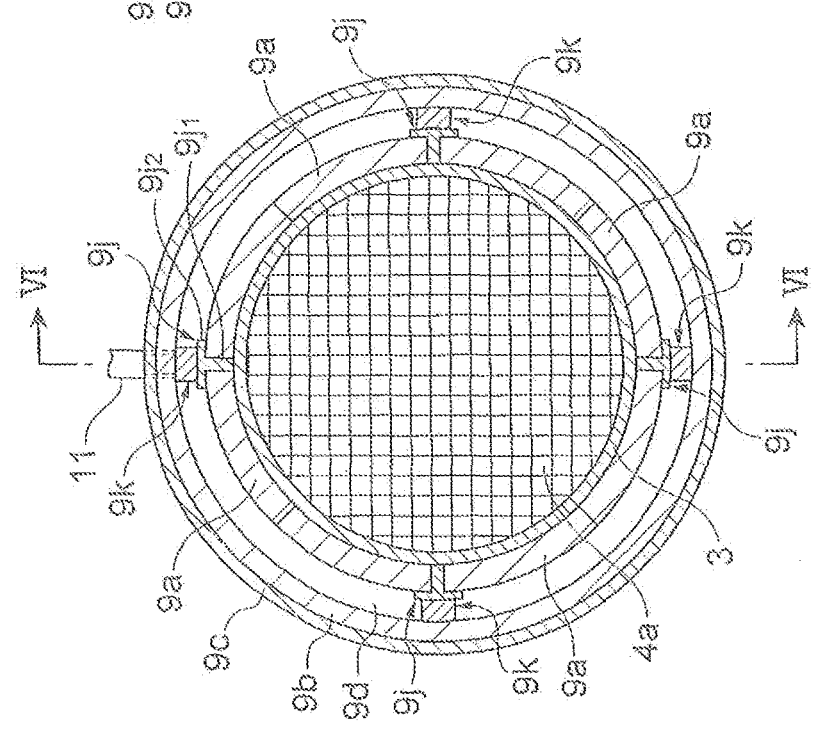

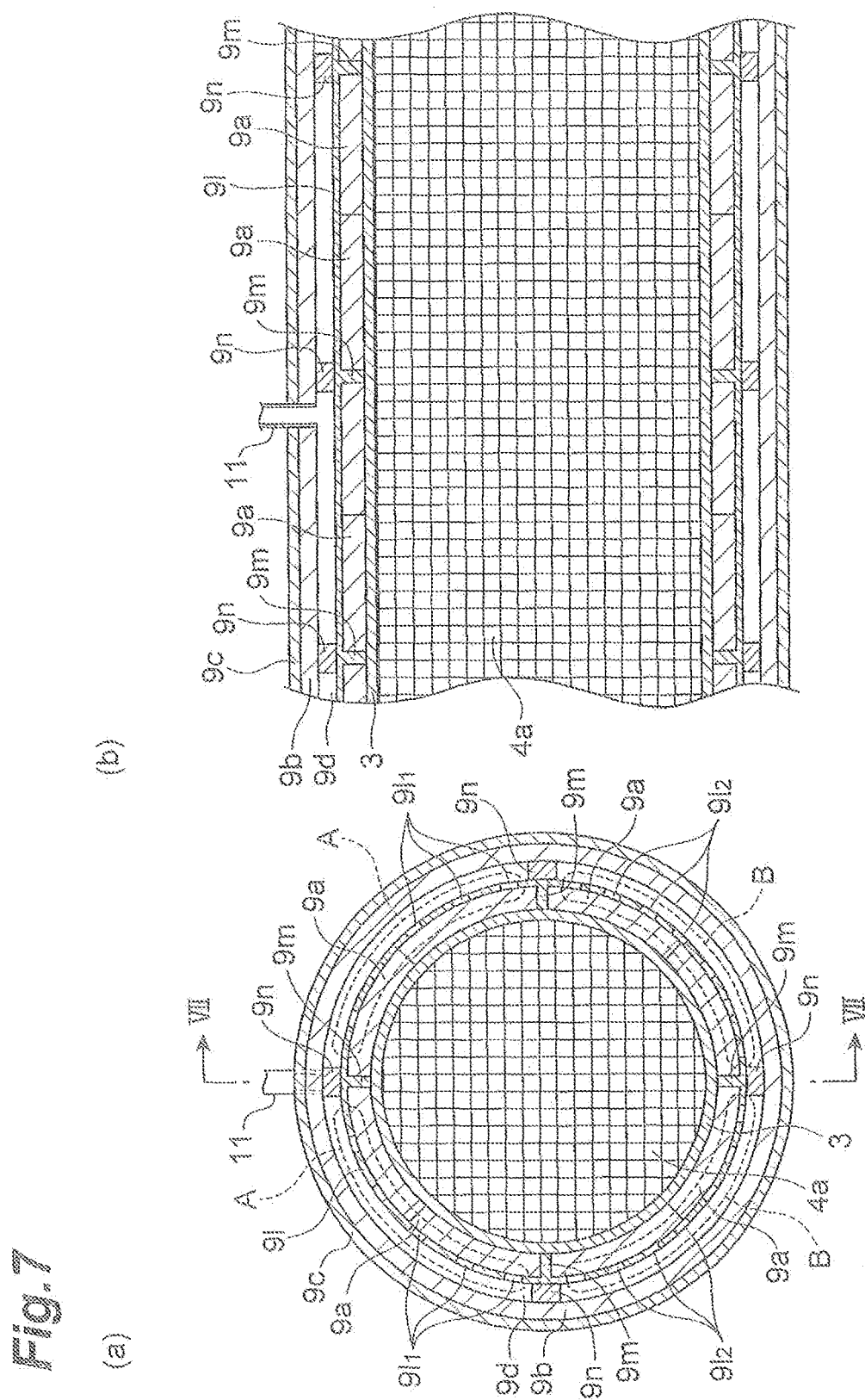

CHEMICAL HEAT STORAGE DEVICE

CROSS REFERENCE TO RELATED APPLICATIONS

This application is a National Stage of International Application No. PCT/JP2014/062965 filed May 15, 2014, claiming priority based on Japanese Patent Application No. 2013-111789 filed May 28, 2013, the contents of all of which are incorporated herein by reference in their entirety.

TECHNICAL FIELD

The present invention relates to a chemical heat storage device for heating a subject to be heated existing in a pipe.

BACKGROUND ART

An exhaust system of a vehicle or the like is provided with a catalyst and the like in order to purify environmental pollutants (HC, CO, NOx, and the like) contained in an exhaust gas discharged from its engine. The catalyst has an optimal temperature (active temperature) for activating its purification performance. When starting the engine, the exhaust gas has a low temperature, which takes time to reach the active temperature of the catalyst. Therefore, when the temperature of the exhaust gas is low at the time of starting the engine and the like, a heating device for warming up the catalyst raises the catalyst temperature to the active temperature in a short time. As the heating device, chemical heat storage devices that utilize the reaction heat of chemical reactions have been known. The chemical heat storage devices can cut down energy losses (fuel consumption losses) and warm up the catalyst. Patent Literature 1 discloses a catalyst warm-up device provided with a heat storage material (reaction material) disposed on the outside of a catalyst. This catalyst warm-up device warms up the catalyst by utilizing the reaction heat of a chemical reaction of the heat storage material.

CITATION LIST

Patent Literature

Patent Literature 1: Japanese Patent Application Laid-Open No. S59-208118

SUMMARY OF INVENTION

Technical Problem

One of the chemical heat storage devices is a chemical heat storage device provided with a reaction material disposed over the whole outer periphery of a subject to be heated such as a catalyst. This chemical heat storage device heats the subject from the whole periphery and thus can rapidly raise the temperature of the subject. Even when the reaction material is disposed over the whole outer periphery of the subject, the number of places for supplying a reaction medium such as ammonia is set smaller in order to cut cost down by reducing the number of parts, and so forth. The number of places for supplying the reaction medium is set to 1, for example. When the number of places for supplying the reaction medium is small, the reaction medium is hard to transfer throughout the reaction material. That is, the reaction medium is hard to transfer to the reaction material distanced from the place of supply. As a result, the chemical heat storage device lowers its heating efficiency, thereby failing to raise the temperature of the whole catalyst rapidly. For example, temperature does not rise rapidly in the catalyst located so as to correspond to the reaction material distanced from the place for supplying the reaction medium.

It is an object of the present invention to provide a chemical heat storage device in which a reaction medium is easy to transfer throughout a reaction material.

Solution to Problem

One aspect of the present invention is a chemical heat storage device for heating a subject to be heated existing in a pipe, the device including a reactor that generates heat by chemically reacting with a reaction medium; an absorber that causes an absorbent to absorb and stores the reaction medium; and a connection tube that is connected to the reactor and absorber, for the reaction medium to migrate through; the reactor including a solid reaction material disposed along an outer peripheral surface of a place where the subject exists in the pipe and a casing that seals the reaction material so as to form a space along an outer peripheral surface of the reaction material; one end of the connection tube being open to the space.

The chemical heat storage device in accordance with the one aspect of the present invention heats the subject to be heated existing in the pipe from the outer peripheral surface of the subject. The chemical heat storage device includes the absorber and the reactor. The absorber and the reactor are connected to each other through the connection tube in the chemical heat storage device. The absorber causes the absorber to absorb and store the reaction medium. In the reactor, the reaction medium is supplied through the connection tube from the absorber and chemically reacts with the reaction material, thereby generating heat. In the reactor, the reaction material is disposed along the outer peripheral surface of the pipe while being sealed with the casing. The reactor is disposed on the outside of the pipe at a position corresponding to the place where the subject exists. The reactor heats the subject through the pipe from its outer periphery. In the reactor, the space is formed along the outer peripheral surface of the reaction material. One end of the connection tube is open to the space. Therefore, when fed from the absorber to the reactor through the connection tube, the reaction medium is supplied into the space from one end of the connection tube. The reaction medium supplied to the space migrates through the space along the outer peripheral surface of the reaction material. Consequently, the reaction medium passes through the space and transfers to the reaction material located at a place distanced from the one end of the connection tube. That is, the reaction medium is easy to transfer throughout the reaction material.

The reactor may further include a support that is disposed between the reaction material and the casing, for forming the space. In this case, the support can form the space along the outer peripheral surface of the reaction material. The support may have one end connected to the pipe or the casing. The support may be disposed while being held between two members defining the space. The support may hold the reaction material against the pipe.

The reactor may further include a heat insulating material disposed along an inner peripheral surface of the casing. In this case, the space is formed between the reaction material and the heat insulating material. The heat insulating material is disposed so as to cover the outer peripheral surface of the reaction material through the space. Therefore, the heat generated from the reaction material is hard to escape to the outside of the reactor (casing). Since the heat insulating material prevents the reaction material from releasing heat to the outside of the reactor, the efficiency of heating the subject improves.

Advantageous Effects of Invention

The present invention can provide the chemical heat storage device in which the reaction medium is easy to transfer throughout the reaction material.

BRIEF DESCRIPTION OF DRAWINGS

FIG. 3 is a sectional view illustrating an example of the most-upstream and most-downstream supports in accordance with the first embodiment;
FIG. 4 is a sectional view of the reactor in accordance with a second embodiment;
FIG. 6 is a sectional view of the reactor in accordance with a fourth embodiment;
and
FIG. 7 is a sectional view of the reactor in accordance with a fifth embodiment.

DESCRIPTION OF EMBODIMENTS

Figure 1:
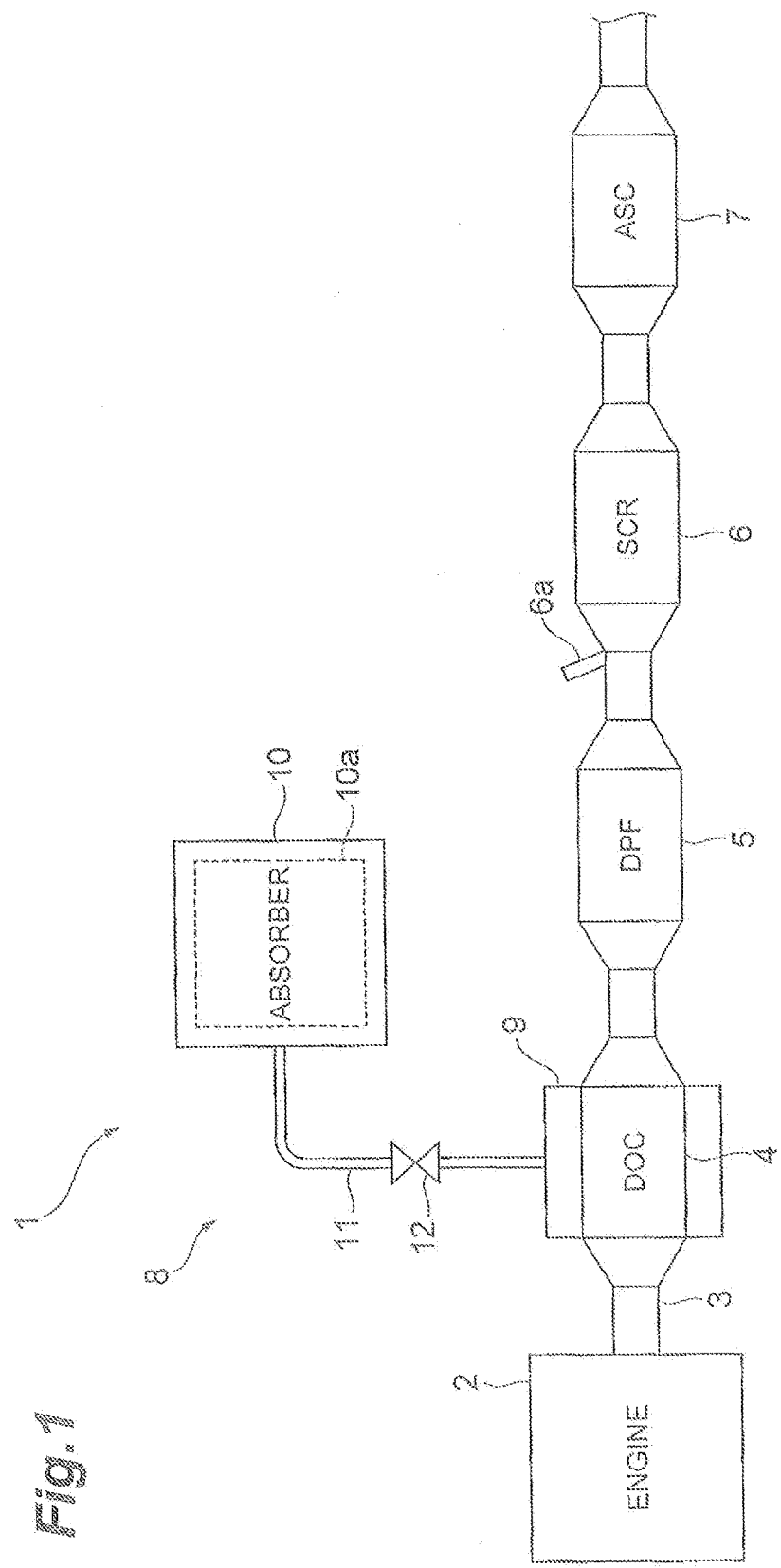
FIG. 1 is a schematic configuration diagram of an exhaust purification system equipped with a chemical heat storage device in accordance with embodiments.

In the following, embodiments of the chemical heat storage device in accordance with the present invention will be explained with reference to the drawings. In the drawings, the same or equivalent constituents will be referred to with the same signs, while omitting their overlapping explanations.

The chemical heat storage device in accordance with the embodiments is a chemical heat storage device included in an exhaust purification system provided in an exhaust system of an engine of a vehicle. The exhaust purification system in accordance with the embodiments purifies harmful substances (environmental pollutants) contained in an exhaust gas discharged from the engine. An example of the engine is a diesel engine. The exhaust purification system in accordance with the embodiments includes DOC (Diesel Oxidation Catalyst), SCR (Selective Catalytic Reduction), and ASC (Ammonia Slip Catalyst) as catalysts and DPF (Diesel Particulate Filter) as a filter. The exhaust purification system in accordance with the embodiments is provided with a chemical heat storage device for warming up a catalyst (DOC). The embodiments include five embodiments having respective configurations for forming a space in a reactor of the chemical heat storage device that are different from each other.

With reference to FIG. 1, an entire configuration of an exhaust purification system 1 that is common in the first to fifth embodiments will be explained. FIG. 1 is a schematic configuration diagram of the exhaust purification system in accordance with the embodiments.

The exhaust purification system 1 includes a diesel oxidation catalyst (DOC) 4, a diesel particulate filter (DPF) 5, a selective catalytic reduction (SCR) 6, and an ammonia slip catalyst (ASC) 7. The DOC 4, DPF 5, SCR 6, and ASC 7 are disposed in an order of the DOC 4, the DPF 5, the SCR 6, and the ASC 7 from the upstream side to downstream side of an exhaust pipe 3. An exhaust gas from an engine 2 is guided to the exhaust pipe 3. In this embodiment, the exhaust pipe 3 functions as a pipe where a subject to be heated exists.

The DOC 4 oxidizes HC, CO, and the like contained in the exhaust gas. The DPF 5 collects and removes PM (Particulate Matter) contained in the exhaust gas. The SCR 6 causes ammonia ($NH_3$) to react chemically with NOx contained in the exhaust gas, thereby reducing and purifying NOx. Ammonia or urea water to become ammonia upon hydrolysis is supplied to the upstream side of the SCR 6 in the exhaust pipe 3 through an injector 6a. The ASC 7 oxidizes ammonia having flowed through the SCR 6 to the downstream side thereof.

The DOC 4, SCR 6, and ASC 7 have respective temperature regions where they can exhibit purification performances for environmental pollutants (i.e., active temperatures). For example, the lower limit for active temperature of the DOC 4 is about 150° C. The temperature of the exhaust gas is relatively low just after being discharged from the engine 2, for example, immediately after starting the engine 2. The temperature of the exhaust gas just after being discharged from the engine 2 is about 100° C., for example. In order for the DOC 4, SCR 6, and ASC 7 to exhibit their purification performances even immediately after starting the engine 2 and the like, it is necessary for the temperatures of the DOC 4, SCR 6, and ASC 7 to rise rapidly to their active temperatures. Therefore, the exhaust purification system 1 includes a chemical heat storage device 8 for warming up the catalysts. The exhaust purification system 1 is provided with a temperature sensor for detecting the temperature of the exhaust gas discharged from the engine 2 (or temperatures of the catalysts).

The chemical heat storage device 8 warms up the catalysts. The chemical heat storage device 8 usually stores the heat of the exhaust gas (exhaust heat) and, when necessary, uses the stored heat, so as to warm up the catalysts. The chemical heat storage device 8 warms up the DOC 4, which is located on the upstream in the exhaust pipe 3, from the outside of the exhaust pipe 3. That is, the chemical heat storage device 8 indirectly warms up the DOC 4 through the exhaust pipe 3. Warming up the DOC 4 causes the exhaust gas having a raised temperature to flow into the SCR 6 and ASC 7 located downstream of the DOC 4. The chemical heat storage device 8 includes a reactor 9, an absorber 10, a connection tube 11, an open-close valve 12, and the like. In this embodiment, the DOC 4 functions as a subject to be heated existing in a pipe.

Figure 2:
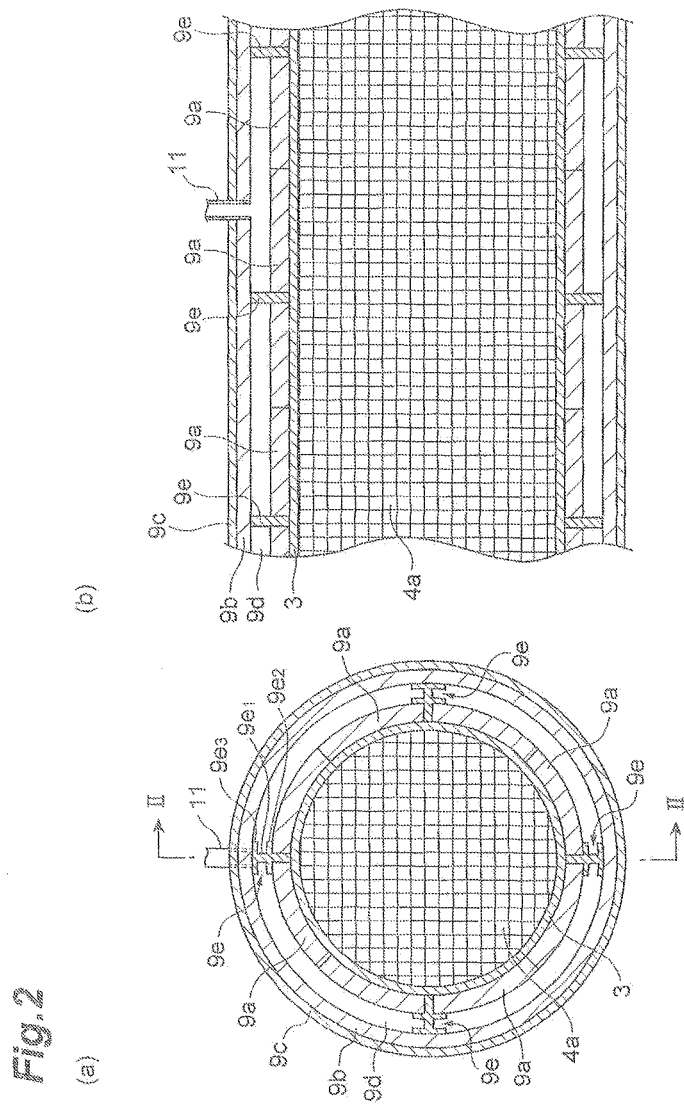
FIG. 2 is a sectional view of a reactor in accordance with a first embodiment.

The reactor 9 is disposed all over the outer peripheral surface of the exhaust pipe 3 at a place where the DOC 4 is disposed. In a cross section cut by a plane orthogonal to the outer peripheral surface of the exhaust pipe 3, the reactor 9 exhibits an annular ring form surrounding the exhaust pipe 3. As illustrated in FIG. 2 and the like, the reactor 9 includes a plurality of reaction materials 9a that chemically react with ammonia (a reaction medium). The plurality of reaction materials 9a constitute one reaction material structure. In the reactor 9, each reaction material 9a chemically reacts with ammonia, so as to absorb (form a coordinate bond with) the latter, thereby generating heat. Each reaction material 9a isolates ammonia at a predetermined temperature or higher, whereupon the reactor 9 starts releasing ammonia. Substantially all of ammonia is released at a second predetermined temperature, which is higher than the first predetermined temperature, or above. The first and second predetermined temperatures vary according to combinations of the reaction materials 9a and ammonia.

Each reaction material 9a is a solid member solidified into a tablet form. A plurality of reaction materials 9a are disposed on the outer peripheral surface of the exhaust pipe 3 so as to be juxtaposed along a direction in which the exhaust pipe 3 extends (the longitudinal direction of the exhaust pipe 3) and circumferentially of the exhaust pipe 3. As illustrated in FIG. 2(b) and the like, each reaction material 9a has an oblong lateral cross section. As illustrated in FIG. 2(a) and the like, the front cross section of each reaction material 9a is shaped into one of a plurality of divided parts of an annular ring. That is, the front cross section of each reaction material 9a has the form of an arc having a predetermined thickness. The plurality of reaction materials 9a disposed in the extending direction of the exhaust pipe 3 and circumferentially of the exhaust pipe 3 constitute the reaction material structure disposed all over the outer peripheral surface of the exhaust pipe 3 at a place where the DOC 4 is located. The reaction material structure constructed by the plurality of reaction materials 9a exhibits a cylindrical form surrounding the exhaust pipe 3. The length of the reaction material structure in the extending direction of the exhaust pipe 3 is on a par with the length of the DOC 4 in the extending direction of the exhaust pipe 3. The reaction materials 9a disposed in contact with the outer peripheral surface of the exhaust pipe 3 warm up the whole DOC 4 from the outside of the DOC 4 through the thin exhaust pipe 3. Usable as the reaction materials 9a is a material that chemically reacts with ammonia, so as to generate heat, thereby raising its temperature to the active temperature of the catalyst or higher. Examples of materials for use in the reaction materials 9a include divalent chlorides ($MCl_2$), divalent bromides ($MBr_2$), and divalent iodides ($MI_2$). Examples of M include Mg, Ni, Co, Fe, Mn, Ca, Sr, Ba, Cu, and Cr. In the embodiments, the direction in which the center axis of the cylinder in the cylinder-shaped reaction material structure coincides with the extending direction of the exhaust pipe 3.

As illustrated in FIG. 2 and the like, the reactor 9 includes a heat insulating material 9b. The heat insulating material 9b is disposed so as to oppose the outer peripheral surface of the plurality of reaction materials 9a (reaction material structure) and cover the outer peripheral surface as a whole. In a cross section cut by a plane orthogonal to the outer peripheral surface of the exhaust pipe 3, the heat insulating material 9b exhibits an annular ring form. The reactor 9 includes a casing 9c that contains the plurality of reaction materials 9a and the heat insulating material 9b. The casing 9c is disposed so as to cover the whole outer peripheral surface of the heat insulating material 9b and both ends of the plurality of reaction materials 9a (reaction material structure) in the extending direction of the exhaust pipe 3. That is, the casing 9c defines both ends of the reactor 9 in the extending direction of the exhaust pipe 3. The casing 9c and exhaust pipe 3 form a closed space therebetween. The casing 9c seals the plurality of reaction materials 9a (reaction material structure) and heat insulating material 9b in the space formed together with the exhaust pipe 3. The heat insulating material 9b is disposed along the inner peripheral surface of the casing 9c. The reaction materials 9a are sealed in the closed space and thus repeatedly chemically react with ammonia.

Within the reactor 9, a space 9d is formed between the reaction materials 9a and heat insulating material 9b. In a cross section cut by a plane orthogonal to the outer peripheral surface of the exhaust pipe 3, the space 9d exhibits an annular ring form. The space 9d is formed along the whole outer peripheral surface of the plurality of reaction materials 9a (reaction material structure). That is, the space 9d is formed so as to be located on the outside of the outer periphery of the plurality of reaction materials 9a and cover the outer peripheral surface of the plurality of reaction materials 9a. The space 9d is defined by the outer peripheral surface of the plurality of reaction materials 9a (reaction material structure) and the inner peripheral surface of the heat insulating material 9b. That is, in a cross section cut by a plane orthogonal to the outer peripheral surface of the exhaust pipe 3, the space 9d has inner and outer diameters coinciding with the outer diameter of the reaction material structure and the inner diameter of the heat insulating material 9b having a circular ring form, respectively. The space 9d functions as a passage for transferring supplied ammonia to each reaction material 9a. One end of the connection tube 11 is open to the space 9d. When supplied from the connection tube 11 into the space 9d, ammonia freely migrates within the space 9d. That is, ammonia freely migrates on the outside of the outer peripheral surface of the plurality of reaction materials 9a (reaction material structure) along the outer peripheral surface. In the embodiments, the plurality of reaction materials 9a (reaction material structure) and the heat insulating material 9b function as two members that define the space 9d. Configurations for forming the space 9d will be explained in the following first to fifth embodiments.

The absorber 10 incorporates therein an absorbent 10a that physically absorbs ammonia. An example of the absorbent 10a is constituted by activated carbon. The absorber 10 can store ammonia in a state physically absorbed by the activated carbon. The absorber 10 stores ammonia, thereby reserving the exhaust heat of the exhaust gas. The absorber 10 isolates and releases ammonia from the activated carbon, and thus released ammonia is supplied to the reactor 9.

The connection tube 11 is connected to the reactor 9 and absorber 10. The connection tube 11 allows ammonia to migrate therethrough. Ammonia migrates between the reactor 9 and absorber 10 through the connection tube 11. As illustrated in FIG. 2 and the like, one end of the connection tube 11 penetrates through the casing 9c and heat insulating material 9b of the reactor 9, so as to be open to the space 9d. For cutting cost down by reducing the number of parts, the embodiments set the number of connection tubes 11 to 1, and the number of places where the connection tube 11 opens to the space 9d to 1. Therefore, ammonia is supplied into the space 9d from only one place (the opening of one connection tube 11). The open-close valve 12 is disposed in the middle of the connection tube 11. Opening the open-close valve 12 enables ammonia to migrate between the reactor 9 and absorber 10 through the connection tube 11. The open-close valve 12 is opened and closed under the control of an ECU (Electronic Control Unit) (not depicted), which controls the engine 2, or the like.

Operations of the chemical heat storage device 8 in the exhaust purification system 1 configured as in the foregoing will now be explained. While the engine 2 is stopped during when the vehicle is halted and the like, the open-close valve 12 is closed. Therefore, even when isolated from activated carbon in the absorber 10, ammonia is not supplied from the absorber 10 to the reactor 9 through the connection tube 11.

When the temperature of the exhaust gas discharged from the engine 2 is lower than a predetermined temperature after starting the engine (e.g., immediately after starting the engine), the open-close valve 12 is opened under the control of the ECU. This enables ammonia to be supplied from the absorber 10 to the reactor 9 through the connection tube 11. When the pressure of the absorber 10 is higher than the pressure of the reactor 9 at this time, ammonia migrates from the absorber 10 to the reactor 9. Ammonia supplied through the connection tube 11 enters the space 9d from the opening of the connection tube 11 and freely migrates through the space 9d serving as a passage. Consequently, ammonia transfers to the reaction material 9a disposed at a place distanced from the opening of the connection tube 11 (the place where ammonia is supplied), for example, at a place separated by 180° circumferentially of the reaction material structure from the opening of the connection tube 11. Therefore, ammonia transfers to each of the plurality of reaction materials 9a. In the reactor 9, each reaction material 9a chemically reacts with and absorbs supplied ammonia, thereby generating heat. The heat generated in the reactor 9 (reaction materials 9a) transfers to the exhaust pipe 3, and the heat having transferred to the exhaust pipe 3 is transmitted to the DOC 4. This heats the DOC 4, whereby the DOC 4, when heated to its activated temperature or higher, favorably purifies the exhaust gas. The above-mentioned predetermined temperature is a temperature set according to the active temperature of the catalyst, for example.

When the temperature of the exhaust gas discharged from the engine is higher than the above-mentioned predetermined temperature, the exhaust heat of the exhaust gas separates ammonia and each reaction material 9a from each other in the reactor 9, thereby generating ammonia. Since the open-close valve 12 is opened, thus separated ammonia returns from the reactor 9 to the absorber 10 through the connection tube 11. At this time, the pressure of the reactor 9 is higher than that of the absorber 10, whereby ammonia transfers to the absorber 10. In the absorber 10, the absorbent 10a stores ammonia by physically absorbing it. When a pressure sensor provided in the absorber 10 exhibits such a pressure value as to indicate a state fully stored with ammonia, the open-close valve 12 is closed under the control of the ECU.

In the chemical heat storage device 8, the space 9d is formed along the outer peripheral surface of the plurality of reaction materials 9a between the reaction materials 9a and heat insulating material 9b of the reactor 9, while ammonia is supplied into the space 9d. This makes it easier for ammonia to transfer to each of the plurality of reaction materials 9a even when the number of places where ammonia is supplied is 1. That is, ammonia is easy to transfer to a place distanced from the place supplying ammonia and thus is likely to transfer to the whole reaction material structure. Therefore, ammonia transfers to each of the plurality of reaction materials 9a, thereby promoting the chemical reaction in each reaction material 9a. As the chemical reaction is promoted, the plurality of reaction materials 9a, i.e., the reaction material structure as a whole, heats the DOC 4 from all over the outer periphery of the DOC 4. As a result, the efficiency at which the chemical heat storage device 8 heats the DOC 4 improves, thereby rapidly raising the temperature of the DOC 4. In the chemical heat storage device 8, the heat insulating material 9b is disposed along the inner peripheral surface of the casing 9c so as to surround the outer peripheral surface of the plurality of reaction materials 9a (reaction material structure) as a whole. The heat insulating material 9b prevents the reaction materials 9a from releasing heat to the outside of the reactor 9 (casing 9c), which further improves the efficiency of heating the DOC 4.

As illustrated in FIG. 2 and the like, the DOC 4 to be heated by the chemical heat storage device 8 is equipped with a honeycomb base 4a having a circular columnar form disposed in the thin exhaust pipe 3 having an annular cross section. The honeycomb base 4a and the like support a catalyst material. Examples of materials for the honeycomb base 4a include cordierite and metals. An example of materials for the exhaust pipe 3 is stainless steel.

With reference to FIG. 2, a configuration for forming the space 9d in the reactor 9 will be explained. FIG. 2 is a sectional view of the reactor in accordance with the first embodiment. In FIG. 2, (a) is a sectional view illustrating the configuration of the reactor 9 cut by a plane orthogonal to the outer peripheral surface of the exhaust pipe 3, while (b) is a sectional view taken along the line II-II in (a). In the examples illustrated in FIGS. 2 to 7, four reaction materials 9a are juxtaposed circumferentially of the outer peripheral surface of the exhaust pipe 3 in one cross section.

In the first embodiment, the reactor 9 includes a plurality of supports 9e in order to form the space 9d in the reactor 9. The plurality of supports 9e are disposed between the plurality of reaction materials 9a (reaction material structure) and the casing 9c. The supports 9e are provided so as to correspond at least to the respective reaction materials 9a. The supports 9e hold their corresponding reaction materials 9a against the exhaust pipe 3, and the heat insulating material 9b against the casing 9c. The supports 9e form the space 9d between the reaction materials 9a (reaction material structure) and the heat insulating material 9b. In the first embodiment, the plurality of supports 9e function as a support for forming the space. The plurality of supports 9e may be disposed between respective pairs of reaction materials 9a adjacent to each other in the plurality of reaction materials 9a instead of being provided for the respective reaction materials 9a.

Each support 9e is located at a center portion of its corresponding reaction material 9a while being located between the exhaust pipe 3 and heat insulating material 9b. As illustrated in FIG. 2(a), the support 9e includes a columnar member $9e_1$ extending radially of the reaction material structure (radially of the exhaust pipe 3) and two beam members $9e_2$, $9e_3$ extending from the columnar member $9e_1$ circumferentially of the reaction material structure (or in the extending direction of the exhaust pipe 3). The columnar member $9e_1$ has one end portion connected to the outer peripheral surface of the exhaust pipe 3 and the other end portion in contact with the inner peripheral surface of the heat insulating material 9b. The columnar member $9e_1$ penetrates through the center portion of the reaction material 9a. The center portion of the reaction material 9a is formed with a hole through which the columnar member $9e_1$ penetrates. The length of the columnar member $9e_1$ is on a par with the sum of the length (thickness) of the reaction material 9a and the length (width) of the space 9d in the radial direction of the reaction material structure. It will be sufficient if the length of the space 9d in the radial direction of the reaction material structure is such that ammonia can migrate. In order to support the reaction material 9a while pressing the reaction material 9a against the exhaust pipe 3, the beam member $9e_2$ located on the reaction material structure side extends from a middle portion of the columnar member $9e_1$ to both sides in the circumferential direction of the reaction material structure along the outer peripheral surface of the reaction material structure. The reaction material 9a is secured to the exhaust pipe 3. It will be sufficient if the beam member $9e_2$ has such a length as to be able to support the reaction material 9a. In order to support the heat insulating material 9b while pressing the heat insulating material 9b against the casing 9c, the beam member $9e_3$ located on the heat insulating material 9b side extends from the other end of the columnar member $9e_1$ to both sides in the circumferential direction of the heat insulating material 9b along the inner peripheral surface of the heat insulating material 9b. It will be sufficient if the beam member $9e_3$ has such a length as to be able to support the heat insulating material 9b. The length of the space 9d in the radial direction of the reaction material structure is set according to the gap between the beam members $9e_2$, $9e_3$. The beam members $9e_2$, $9e_3$ may expand like disks about the columnar member $9e_1$. The beam members $9e_2$, $9e_3$ may expand to both sides in the extending direction of the exhaust pipe 3.

In the first embodiment, the reaction material 9a is securely held against the exhaust pipe 3 by the beam member $9e_2$ of the support 9e connected to the exhaust pipe 3. The heat insulating material 9b is securely held against the casing 9c by the beam member $9e_3$ of the support 9e extending to the heat insulating material 9b. The beam members $9e_2$, $9e_3$ disposed with a predetermined gap therebetween form the space 9d between the reaction material 9a and heat insulating material 9b.

Configurations of supports disposed as the most-upstream and most-downstream ones in the direction in which the exhaust gas flows through the exhaust pipe 3 will be explained with reference to FIG. 3. FIG. 3 is a sectional view illustrating an example of the most-upstream and most-downstream supports in accordance with the first embodiment. In FIG. 3, (a) illustrates a configuration in which a support penetrates through a reaction material and has one end connected to the exhaust pipe, while (b) illustrates a configuration in which a support is connected to the casing of the reactor. As illustrated in FIG. 3(a), a support 9f includes a columnar member $9f_1$ and beam members $9f_2$, $9f_3$ as with the above-mentioned support 9e. The columnar member $9f_1$ has a function equivalent to that of the columnar member $9e_1$. The beam members $9f_2$, $9f_3$ have functions equivalent to those of the beam members $9e_2$, $9e_3$. In the support 9f, the columnar member $9f_1$ penetrates through the reaction material 9a and is connected to the exhaust pipe 3 as in the above-mentioned support 9e. As illustrated in FIG. 3(b), a support 9g includes two beam members $9g_1$, $9g_2$. The casing 9c has side walls located at both ends in the extending direction of the exhaust pipe 3. In order to support the reaction material 9a while pressing the reaction material 9a against the exhaust pipe 3, the beam member $9g_1$ located on the reaction material 9a side is connected to the side wall and extends from the side wall of the casing 9c along the outer peripheral surface of the reaction material 9a in the extending direction of the exhaust pipe 3. In order to support the heat insulating material 9b while pressing the heat insulating material 9b against the casing 9c, the beam member $9g_2$ located on the heat insulating material 9b side is connected to the side wall and extends from the side wall of the casing 9c along the inner peripheral surface of the heat insulating material 9b in the extending direction of the exhaust pipe 3. The length of the space 9d in the radial direction of the reaction material structure is set according to the gap between the beam members $9g_1$, $9g_2$. The most-upstream and most-downstream supports may use any of the supports illustrated in (a) and (b) of FIG. 3.

With reference to FIG. 4, a configuration for forming the space 9d in the reactor 9 in accordance with the second embodiment will be explained. FIG. 4 is a sectional view of the reactor in accordance with the second embodiment. In FIG. 4, (a) is a sectional view illustrating the configuration of the reactor 9 cut by a plane orthogonal to the outer peripheral surface of the exhaust pipe 3, while (b) is a sectional view taken along the line IV-IV in (a).

In the second embodiment, the reactor 9 includes four spacers 9h in order to form spaces 9d in the reactor 9. The four spacers 9h are disposed for respective reaction material rows each constituted by a plurality of reaction materials 9a juxtaposed in the extending direction of the exhaust pipe 3. In this embodiment, the reaction material structure is constituted by four reaction material columns. Each spacer 9h holds the plurality of reaction materials 9a constituting its corresponding reaction material row against the exhaust pipe 3, and the heat insulating material 9b against the casing 9c. The spacers 9h form the spaces 9d between the reaction materials 9a (reaction material structure) and heat insulating material 9b. In the second embodiment, each spacer 9h functions as a support for forming the space 9d. The spacer 9h, which will be explained in the following, extends from one end of its corresponding reaction material row to the other end in the longitudinal direction of the reaction material row. In place of the spacer 9h, a plurality of spacers each having a predetermined length (shorter than the length of the reaction material row) may be disposed at predetermined intervals for each reaction material row. The spacer 9h is not required to be disposed for each reaction material row, but may be disposed between a pair of reaction material rows adjacent to each other. A plurality of spacers each having a predetermined length may be disposed at predetermined intervals in place of the spacer 9h in this case as well. The plurality of spacers may be disposed for each of the reaction materials 9a or between each pair of the reaction materials 9a adjacent to each other. The spacer 9h is disposed in the space 9d while being held between the reaction material 9a and heat insulating material 9b.

The spacer 9h is disposed at a center portion of the reaction material row in the circumferential direction of the reaction material structure. The spacer 9h is disposed so as to extend from one end of the reaction material row to the other end in the longitudinal direction of the reaction material row while being located between the reaction material row and heat insulating material 9b. As illustrated in FIG. 4(a), the spacer 9h is disposed at a position distanced from the opening of the connection tube 11 so as not to block the opening of the connection tube 11. When not provided so as to extend from one end of the reaction material row to the other end in the longitudinal direction of the reaction material row, the spacer 9h is not required to be disposed at a position distanced from the opening of the connection tube 11. The length of the spacer 9h in the extending direction of the exhaust pipe 3 is the same as each of the length of the reaction material row constituted by a plurality of reaction materials 9a and the length of the heat insulating material 9b in the extending direction of the exhaust pipe 3. As illustrated in FIG. 4(a), the spacer 9h has a columnar member $9h_1$ extending radially of the reaction material structure (radially of the exhaust pipe 3) and two beam members $9h_2$, $9h_3$ extending circumferentially of the reaction material structure. The columnar member $9h_1$ extends between the outer peripheral surface of the reaction material 9a and the inner peripheral surface of the heat insulating material 9b. The columnar member $9h_1$ has the length of the space 9d in the radial direction of the reaction material structure. In order to support the reaction material 9a while pressing the reaction material 9a against the exhaust pipe 3, the beam member $9h_2$ located on the reaction material structure side extends from one end portion of the columnar member $9h_1$ to both sides in the circumferential direction of the reaction material structure along the outer peripheral surface of the reaction material structure. The beam member $9h_2$ extends from one end of the reaction material structure to the other end in the longitudinal direction of the reaction material row. It will be sufficient if the beam member $9h_2$ has such a length as to be able to support the reaction material $9a$. In order to support the heat insulating material $9b$ while pressing the heat insulating material $9b$ against the casing $9c$, the beam member $9h_3$ located on the heat insulating material $9b$ side extends from the other end portion of the columnar member $9h_1$ to both sides in the circumferential direction of the heat insulating material $9b$ along the inner peripheral surface of the heat insulating material $9b$. The beam member $9h_3$ extends from one end of the reaction material row to the other end in the longitudinal direction of the reaction material row. It will be sufficient if the beam member $9h_3$ has such a length as to be able to support the reaction material $9a$. The length of the space $9d$ in the radial direction of the reaction material structure is set according to the gap between the beam members $9h_2$, $9h_3$ (the length of the columnar member $9h_1$). The spacer $9h$ may be formed with a through hole. This makes it easier for ammonia to migrate between the spaces $9d$ adjacent to each other with the spacer $9h$ interposed therebetween.

In the second embodiment, the spacer $9h$ is disposed between the reaction material $9a$ and heat insulating material $9b$, so as to hold the reaction material $9a$ against the exhaust pipe 3, and the heat insulating material $9b$ against the casing $9c$. The spacer $9h$ forms the space $9d$ between the reaction material $9a$ and heat insulating material $9b$. The second embodiment requires no member to be connected to the exhaust pipe 3, casing $9c$, or the like and thus can cut down man-hours for assembling supports.

In the second embodiment, ammonia is supplied at first to one space $9h$ where the connection tube 11 is open. Ammonia supplied to one space $9d$ where the connection tube 11 is open enters a plurality of reaction materials $9a$ in contact with the one space $9d$ and is absorbed by the reaction materials $9a$. At this time, a part of ammonia passes through the plurality of reaction materials $9a$ in contact with the one space $9d$, so as to reach another space $9d$ adjacent to the one space $9d$ where the connection tube 11 is open, thereby entering a plurality of reaction materials $9a$ in contact with this space $9d$. Repeating these phenomena supplies ammonia to all the spaces $9d$.

Figure 5:
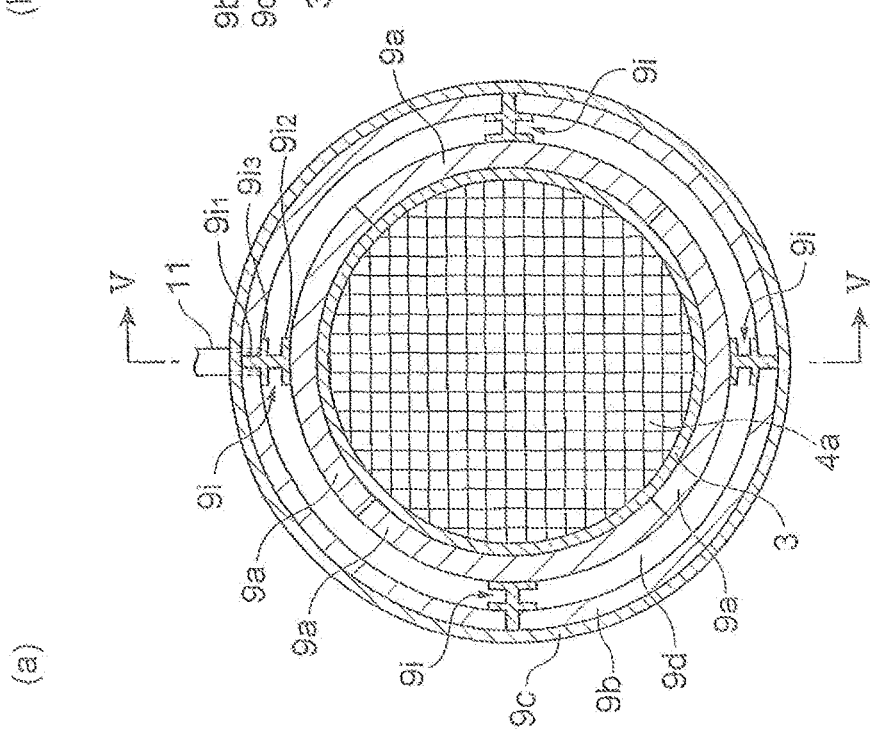
FIG. 5 is a sectional view of the reactor in accordance with a third embodiment.

With reference to FIG. 5, a configuration for forming the space $9d$ in the reactor 9 in accordance with the third embodiment will be explained. FIG. 5 is a sectional view of the reactor in accordance with the third embodiment. In FIG. 5, (a) is a sectional view illustrating the configuration of the reactor 9 cut by a plane orthogonal to the outer peripheral surface of the exhaust pipe 3, while (b) is a sectional view taken along the line V-V in (a).

In the third embodiment, the reactor 9 includes a plurality of supports $9i$ in order to form the space $9d$ in the reactor 9. The supports $9i$ are provided so as to correspond at least to the respective reaction materials $9a$. The supports $9i$ hold their corresponding reaction materials $9a$ against the exhaust pipe 3, and the heat insulating material $9b$ against the casing $9c$. The supports $9i$ form the space $9d$ between the reaction materials $9a$ (reaction material structure) and the heat insulating material $9b$. In the third embodiment, the plurality of supports $9i$ function as a support for forming the space. The plurality of supports $9i$ may be disposed between respective pairs of reaction materials $9a$ adjacent to each other in the plurality of reaction materials $9a$ instead of being provided for the respective reaction materials $9a$.

Each support $9i$ is located at a center portion of its corresponding reaction material $9a$ while being located between the reaction material $9a$ and casing $9c$. As illustrated in FIG. 5(a), the support $9i$ includes a columnar member $9i_1$ extending radially of the reaction material structure (radially of the exhaust pipe 3) and two beam members $9i_2$, $9i_3$ extending from the columnar member $9i_1$ circumferentially of the reaction material structure (or in the extending direction of the exhaust pipe 3). The columnar member $9i_1$ has one end portion connected to the inner peripheral surface of the casing $9c$ and the other end portion in contact with the outer peripheral surface of the reaction material $9a$. The columnar member $9i_1$ penetrates through the center portion of the reaction material $9a$. The center portion of the reaction material $9a$ is formed with a hole through which the columnar member $9i_1$ penetrates. The length of the columnar member $9i_1$ is on a par with the sum of the length (thickness) of the heat insulating material $9b$ and the length (width) of the space $9d$ in the radial direction of the reaction material structure. In order to support the reaction material $9a$ while pressing the reaction material $9a$ against the exhaust pipe 3, the beam member $9i_2$ located on the reaction material structure side extends from the other end of the columnar member $9i_1$ to both sides in the circumferential direction of the reaction material structure along the outer peripheral surface of the reaction material structure. It will be sufficient if the beam member $9i_2$ has such a length as to be able to support the reaction material $9a$. In order to support the heat insulating material $9b$ while pressing the heat insulating material $9b$ against the casing $9c$, the beam member $9i_3$ located on the heat insulating material $9b$ side extends from a middle portion of the columnar member $9i_1$ to both sides in the circumferential direction of the heat insulating material $9b$ along the inner peripheral surface of the heat insulating material $9b$. It will be sufficient if the beam member $9i_3$ has such a length as to be able to support the heat insulating material $9b$. The length of the space $9d$ in the radial direction of the reaction material structure is set according to the gap between the beam members $9i_2$, $9i_3$. The beam members $9i_2$, $9i_3$ may expand like disks about the columnar member $9i_1$ as with the beam members $9e_2$, $9e_3$. The beam members $9i_2$, $9i_3$ may expand to both sides in the extending direction of the exhaust pipe 3 as with the beam members $9e_2$, $9e_3$. The supports disposed as the most-upstream and most-downstream ones in the direction in which the exhaust gas flows through the exhaust pipe 3 may be those penetrating through the heat insulating material $9b$ while having one end connected to the casing $9c$ or those connected to a side wall of the casing $9c$.

In the third embodiment, the heat insulating material $9b$ is securely held against the casing $9c$ by the beam member $9i_3$ of the support $9i$ connected to the casing $9c$. The reaction material $9a$ is securely held against the exhaust pipe 3 by the beam member $9i_2$ of the support $9i$ extending to the reaction material $9a$. The beam members $9i_2$, $9i_3$ located with a predetermined gap therebetween form the space $9d$ between the reaction material $9a$ and heat insulating material $9b$.

With reference to FIG. 6, a configuration for forming the space $9d$ in the reactor 9 in accordance with the fourth embodiment will be explained. FIG. 6 is a sectional view of the reactor in accordance with the fourth embodiment. In FIG. 6, (a) is a sectional view illustrating the configuration of the reactor 9 cut by a plane orthogonal to the outer peripheral surface of the exhaust pipe 3, while (b) is a sectional view taken along the line VI-VI in (a).

In the fourth embodiment, the reactor includes four supports $9j$ and a plurality of spacers $9k$ in order to form the space $9d$ in the reactor 9. The supports $9j$ are disposed for respective reaction material columns each constituted by a plurality of reaction materials $9a$ juxtaposed in the extending direction of the exhaust pipe 3. The plurality of spacers $9k$ are disposed at respective positions corresponding to columnar members $9j_1$ of the supports $9j$. The supports $9j$ hold the reaction materials $9a$ against the exhaust pipe 3. While being disposed on the support $9j$, each spacer $9k$ holds the heat insulating material $9b$ against the casing $9c$ and forms the space $9d$ between each reaction material $9a$ (reaction material structure) and the heat insulating material $9b$. The support $9j$ functions as a foundation where the spacer $9k$ is disposed. In the fourth embodiment, the four supports $9j$ and plurality of spacers $9k$ function as a support for forming the space. The support $9j$, which will be explained in the following, extends from one end of its corresponding reaction material row to the other end in the longitudinal direction of the reaction material row. In place of the spacer $9j$, a plurality of spacers each having a predetermined length (shorter than the length of the reaction material row) may be disposed at predetermined intervals for each reaction material row.

The support $9j$ is disposed at a center portion of the reaction material row in the circumferential direction of the reaction material structure. The support $9j$ is disposed so as to extend from the exhaust pipe 3 to the outer peripheral surface side of the reaction material row (reaction material $9a$). As illustrated in FIG. 6, the support $9j$ includes a plurality of columnar members $9j_1$ extending radially of the reaction material structure (radially of the exhaust pipe 3) and a beam member $9j_2$ extending circumferentially of the reaction material structure from an end portion of each columnar member $9j_1$. The plurality of columnar members $9j_1$ are disposed at predetermined intervals in the extending direction of the exhaust pipe 3. The columnar members $9j_1$ are disposed for the respective reaction materials $9a$, for example. Each columnar member $9j_1$ has one end portion connected to the outer peripheral surface of the exhaust pipe 3 and the other end portion extending to the outer peripheral surface side of the reaction material $9a$. The columnar member $9j_1$ penetrates through the reaction material $9a$ and is connected to the inner peripheral surface of the beam member $9j_2$. The reaction material $9a$ is formed with a hole through which the columnar member $9j_1$ penetrates. The length of the columnar member $9j_1$ is on a par with the length (thickness) of the reaction material $9a$ in the radial direction of the reaction material structure. The beam member $9j_2$ is disposed so as to extend from one end of the reaction material row to the other end in the longitudinal direction of the reaction material row. In order to support the reaction material $9a$ while pressing the reaction material $9a$ against the exhaust pipe 3, the beam member $9j_2$ extends from the other end portion of the columnar member $9j_1$ to both sides in the circumferential direction of the reaction material structure along the outer peripheral surface of the reaction material structure. The beam member $9j_2$ extends from one end of the reaction material row to the other end of the reaction material row. The beam member $9j_2$ is not required to be supported by the columnar member $9j_1$. The beam member $9j_2$ may be supported by connecting both end portions in the longitudinal direction of the reaction material row to the respective side walls of the casing $9c$.

The plurality of spacers $9k$ are disposed at respective positions corresponding to the columnar members $9j_1$ of the supports $9j$ while being located between the beam member $9j_2$ of the support $9j$ and the heat insulating material $9b$. In order to support the heat insulating material $9b$ and form the space $9d$ while pressing the heat insulating material $9b$ against the casing $9c$, each spacer $9k$ is disposed while being held between the inner peripheral surface of the heat insulating material $9b$ and the outer peripheral surface of the beam member $9j_2$ of the support $9j$. Each spacer $9k$ is a member shaped into a rectangular parallelepiped (or a regular hexahedron, a circular column, or the like). The length of the spacer $9k$ in the radial direction of the reaction material structure is on a par with the difference between the length (width) of the space $9d$ and the thickness of the beam member $9j_2$ of the support $9j$ in the radial direction of the reaction material structure. The length of the space $9d$ in the radial direction of the reaction material structure can be changed according to the length of the spacer $9k$ in the radial direction of the reaction material structure. It will be sufficient if the cross section of the spacer $9k$ has such a size or form as to be able to support the heat insulating material $9b$.

In the fourth embodiment, the reaction materials $9a$ are securely held against the exhaust pipe 3 by the beam members $9j_2$ of the supports $9j$ connected to the exhaust pipe 3. Since the spacers $9k$ are disposed between the beam members $9j_2$ of the supports $9j$ and the heat insulating material $9b$, the heat insulating material $9b$ is held against the casing $9c$. The spacers $9k$ form the space $9d$ between the reaction material $9a$ and heat insulating material $9b$.

With reference to FIG. 7, a configuration for forming the space $9d$ in the reactor 9 in accordance with the fifth embodiment will be explained. FIG. 7 is a sectional view of the reactor in accordance with the fifth embodiment. In FIG. 7, (a) is a sectional view illustrating the configuration of the reactor 9 cut by a plane orthogonal to the outer peripheral surface of the exhaust pipe 3, while (b) is a sectional view taken along the line VII-VII in (a).

In the fifth embodiment, the reactor 9 includes a cylindrical body $9l$ and a plurality of columnar bodies $9m$ and spacers $9n$ in order to form the space $9d$ in the reactor 9. The cylindrical body $9l$ is disposed along the outer peripheral surface of the reaction materials $9a$ (reaction material structure). The columnar bodies $9m$ are disposed at predetermined intervals in the extending direction of the exhaust pipe 3 between the cylindrical body $9l$ and exhaust pipe 3. The columnar bodies $9m$ are disposed for the respective reaction materials $9a$, for example. The plurality of spacers $9n$ are disposed at the respective positions corresponding to the columnar bodies $9m$. The cylindrical body $9l$ and plurality of columnar bodies $9m$ hold the reaction materials $9a$ against the exhaust pipe 3. While being disposed on the cylindrical body $9l$, each spacer $9n$ holds the heat insulating material $9b$ against the casing $9c$ and forms the space $9d$ between each reaction material $9a$ (reaction material structure) and the heat insulating material $9b$. The cylindrical body $9l$ functions as a foundation where the spacers $9k$ are disposed. In the fifth embodiment, the cylindrical body $9l$ and the plurality of columnar bodies $9m$ and spacers $9n$ function as a support for forming the space. In the fifth embodiment, the cylindrical body $9l$ functions as a part of members defining the space $9d$.

The cylindrical body $9l$ is disposed so as to surround the reaction material structure as a whole along the outer peripheral surface of the reaction materials $9a$ (reaction material structure). As illustrated in FIG. 7, the plurality of columnar bodies $9m$, each extending radially of the reaction material structure (radially of the exhaust pipe 3), are connected to the inner peripheral surface of the cylindrical body $9l$. The cylindrical body $9l$ is disposed along the outer peripheral surface of the reaction material structure all over the outer peripheral surface in order to support the reaction materials $9a$ while pressing the reaction material $9a$ against the exhaust pipe 3. The cylindrical body $9l$ is formed with a plurality of holes in order for ammonia flowing through the space 9d to migrate to the reaction materials 9a. The plurality of holes are formed such that ammonia supplied from one opening of the connection tube 11 transfers to the reaction materials 9a (reaction material structure) as uniformly as possible. The following is an example of patterns of forming the plurality of holes. In the cylindrical body 9l, no holes are formed in a region immediately below the opening of the connection tube 11. In the cylindrical body 9l, the region other than the region immediately below the opening of the connection tube 11 includes, as seen in the center axis direction of the exhaust pipe 3, a first region A located in an area extending by 90° circumferentially of the reaction material structure from the region immediately below the opening of the connection tube 11 and a second region B located in an area extending from 90° to 180° circumferentially of the reaction material structure. The first region A is expected to exhibit a high flow rate of ammonia and a large amount of supply of ammonia. Therefore, the number of holes $9l_1$ formed in the first region A is set small, or the diameter of holes $9l_1$ formed in the first region A is set small. The second region B is expected to exhibit a lower flow rate of ammonia and a smaller amount of supply of ammonia than the first region A. Therefore, the number of holes $9l_2$ formed in the second region B is set large, or the diameter of holes $9l_2$ formed in the first region B is set large. In place of the above-mentioned forming pattern, the number or size of holes may be made greater as the angle increases within the range of 180° circumferentially of the reaction material structure from the region immediately below the opening of the connection tube 11. The number or size of holes may be made greater with increasing distance from the region immediately below the opening of the connection tube 11 not only circumferentially of the reaction material structure but also in the extending direction of the exhaust pipe 3. The cylindrical body 9l is not required to be supported by the columnar bodies 9m. The cylindrical body 9l may be supported by connecting its both end portions to the side walls of the casing 9c, respectively.

The plurality of columnar bodies 9m are disposed at predetermined intervals in the extending direction of the exhaust pipe 3. The columnar bodies 9m are disposed for the respective reaction materials 9a, for example. Each columnar body 9m has one end portion connected to the outer peripheral surface of the exhaust pipe 3 and the other end portion extending to the inner peripheral surface of the cylindrical body 9l. The columnar body 9m penetrates through the reaction material 9a and is connected to the inner peripheral surface of the cylindrical body 9l. The reaction material 9a is formed with a hole through which the columnar body 9m penetrates. The length of the columnar body 9m is on a par with the length (thickness) of the reaction material 9a in the radial direction of the reaction material structure.

The plurality of spacers 9n are disposed at the respective positions corresponding to the columnar bodies 9m while being located between the cylindrical body 9l and heat insulating material 9b. The spacers 9n are members similar to the spacers 9k in the fourth embodiment and thus will not be explained in detail.

In the fifth embodiment, all the reaction materials 9a (the whole reaction material structure) are securely held against the exhaust pipe 3 by the cylindrical body 9l connected to the exhaust pipe 3 through the columnar bodies 9m. Since the spacers 9n are disposed between the cylindrical body 9l and heat insulating material 9b, the heat insulating material 9b is supported by the casing 9c. The spacers 9n form the space 9d between the reaction materials 9a and heat insulating material 9b. Changing the number or size of holes formed in the cylindrical body 9l according to the distance from the opening of the connection tube 11 enables ammonia supplied to the space 9d to transfer to each reaction material 9a (reaction material structure) as uniformly as possible. This promotes the chemical reaction even in the reaction materials 9a distanced from the opening of the connection tube 11.

It will be sufficient if materials for the above-mentioned spacers, cylindrical body, and columnar bodies are those that can support the reaction materials 9a or heat insulating material 9b. An example of the materials is stainless steel as in the exhaust pipe 3.

While embodiments in accordance with the present invention are explained in the foregoing, the present invention can be carried out in various modes without being restricted to the above-mentioned embodiments.

The present invention is employed in an exhaust purification system including the DOC, SCR, and ASC as catalysts and the DPF as a filter in the embodiments, but is also applicable to other exhaust purification systems having various configurations. The vehicle is not limited to the diesel engine car employed above, but may be any of gasoline engine cars and the like. The present invention is also applicable to exhaust purification systems not for vehicles. The present invention can be applied not only to exhaust purification systems but also to others.

The subject to be heated in the chemical heat storage device is the DOC serving as a catalyst in the embodiments, but may be catalysts and the like other than the DOC. The subject to be heated may be a catalyst such as the SCR or an exhaust gas flowing through the exhaust pipe, for example. The reactor of the chemical heat storage device includes a heat insulating material in the embodiments but may lack the heat insulating material. The reaction medium of the chemical reaction, which is ammonia in the embodiments, may be media other than ammonia, such as carbon dioxide, alcohol, and water.

Ammonia serving as the reaction medium may be supplied to the space in the reactor from two or more places for supply instead of one place as in the embodiments. For example, a connection tube bifurcated on one end side may be used so as to supply ammonia to the space from two places for supply separated from each other in the direction in which the exhaust pipe flows through the exhaust pipe or in the circumferential direction of the reaction material structure. The reaction materials distanced from each place of supply also exist in this case. However, ammonia also transfers through the space to the reaction materials distanced from each place of supply.

The space in the reactor in the chemical heat storage device may be formed along only a portion of the outer peripheral surface of the reaction material structure instead of the whole outer peripheral surface of the reaction material structure as in the embodiments. For example, in the reactor, the reaction materials may be disposed without forming the space in a region opposing the opening of the connection tube across the exhaust pipe. In this case, no support is required to be disposed in the region opposing the opening of the connection tube across the exhaust pipe.

For forming the space in the reactor, the embodiments employ a configuration using supports, a configuration using spacers, a configuration using supports and spacers, and a configuration using a cylindrical body, columnar bodies, and spacers, which are not restrictive. Any configuration may be employed as long as it can form the space while supporting the reaction materials and heat insulating materials. For example, a nonwoven fabric, a porous sheet, or the like that can pass therethrough a reaction medium such as ammonia may be inserted in all the regions between the reaction materials and heat insulating material or at predetermined intervals between the reaction materials and heat insulating material. Examples of materials for the nonwoven fabric or porous sheet include corrosion-resistant metals or alloys such as stainless steel, nickel, titanium, and Monel as well as ceramics. A cylindrical body extending along the outer peripheral surface of the reaction materials and a cylindrical body extending along the inner peripheral surface of the heat insulating material may be disposed with a predetermined gap therebetween by disposing a plurality of columnar bodies between the two cylindrical bodies. When the reactor includes no heat insulating material, any configuration may be employed as long as it can form the space while supporting the reaction materials.

While the embodiments mention stainless steel as a material for forming the support by way of example, it is not restrictive. The support may be formed by an elastic body. In this case, the support can absorb thermal expansion of the reaction materials. When the support (spacer) of the second embodiment is formed from an elastic body, it is highly effective in absorbing thermal expansion of the reaction materials.

In the fifth embodiment, in order for ammonia to transfer to the reaction materials uniformly, the number or size of holes is changed according to the distance from the opening of the connection tube in the cylindrical body, whereby anisotropy exists in the space. Anisotropy may similarly exist in the space according to the form of supports, the form of spacers, and the like in the other embodiments as well. Anisotropy existing in the space changes the easiness for ammonia to flow in the circumferential direction of the reaction material structure or the extending direction of the exhaust pipe. As a result, it is easy for ammonia to reach places distanced from the opening of the connection tube, whereby ammonia transfers uniformly to the reactor.

INDUSTRIAL APPLICABILITY

The present invention can be utilized in a warm-up device for warming up a catalyst disposed in an exhaust system of an engine.

REFERENCE SIGNS LIST

1: exhaust purification system; 2: engine; 3: exhaust pipe; 4: DOC; 4$a$: honeycomb base; 5: DPF; 6: SCR; 6$a$: injector; 7: ASC; 8: chemical heat storage device; 9: reactor; 9$a$: reaction material; 9$b$: heat insulating material; 9$c$: casing; 9$d$: space; 9$e$, 9$f$, 9$g$, 9$i$, 9$j$: support; 9$e_1$, 9$f_1$, 9$l_1$, 9$j_1$: columnar member; 9$e_2$, 9$e_3$, 9$f_2$, 9$f_3$, 9$g_1$, 9$g_2$, 9$i_2$, 9$i_3$, 9$j_2$: beam member; 9$h$, 9$k$, 9$n$: spacer; 9$h_1$: columnar member; 9$h_2$, 9$h_3$: beam member; 9$l$: cylindrical body; 9$l_1$, 9$l_2$: hole; 9$m$: columnar body; 10: absorber; 11: connection tube; 12: open-close valve.

The invention claimed is:

1. A chemical heat storage device for heating a subject to be heated existing in a pipe, the device comprising:
   a reactor that generates heat by chemically reacting with a reaction medium;
   an absorber that causes an absorbent to absorb and stores the reaction medium; and
   a connection tube that is connected to the reactor and absorber, for the reaction medium to migrate through;
   wherein the reactor includes:
   a plurality of solid reaction materials disposed to be juxtaposed along an outer peripheral surface of a place where the subject exists in the pipe;
   a casing that seals the reaction materials so as to form a space along outer peripheral surfaces of the reaction materials; and
   a support that is provided for the reaction material and forms the space
   wherein one end of the connection tube is open to the space,
   wherein the support includes a first support portion that supports the reaction material to pipe side, and
   wherein the first support portion includes a first contact portion in contact with the outer peripheral surface of the reaction material, and presses the reaction material against the pipe with the first contact portion to support the reaction material.

2. The chemical heat storage device according to claim 1, wherein the reactor further includes a heat insulating material disposed between the space and the casing, and
   wherein the support includes a second support portion that supports the heat insulating material to the casing side.

3. The chemical heat storage device according to claim 2, wherein the second support portion includes a second contact portion in contact with an inner peripheral surface of the heat insulating material, and presses the heat insulating material against the casing with the second contact portion to support the heat insulating material.

4. The chemical heat storage device according to claim 1, wherein the support is connected to the pipe or the casing at one end of the support.

* * * * *